T. S. Disston,
Cross Cut Saw Handle.

No. 110,751.   Patented Jan. 3, 1871.

T. S. Disston
by his Atty
Krosen and Sen

Witnesses,
Jno. B. Hassding
Harry Smith

United States Patent Office.

THOMAS S. DISSTON, OF PHILADELPHIA, PENNSYLVANIA, ASSIGNOR TO HIMSELF AND HENRY DISSTON & SON, OF SAME PLACE.

Letters Patent No. 110,751, dated January 3, 1871.

IMPROVEMENT IN HANDLES FOR CROSS-CUT SAWS.

The Schedule referred to in these Letters Patent and making part of the same.

I, THOMAS S. DISSTON, of Philadelphia, county of Philadelphia, State of Pennsylvania, have invented a Handle and Attachment for Cross-Cut Saws of which the following is a specification.

Nature and Object of the Invention.

My invention consists of a handle for cross-cut saws, provided with appliances, too fully described hereafter to need preliminary explanation, the object of my invention being the ready and secure attachment of the handle to the blade, and its ready detachment therefrom, and the easy adjustment of the handle to different positions in respect to the blade.

Description of the Accompanying Drawing.

Figure 1:
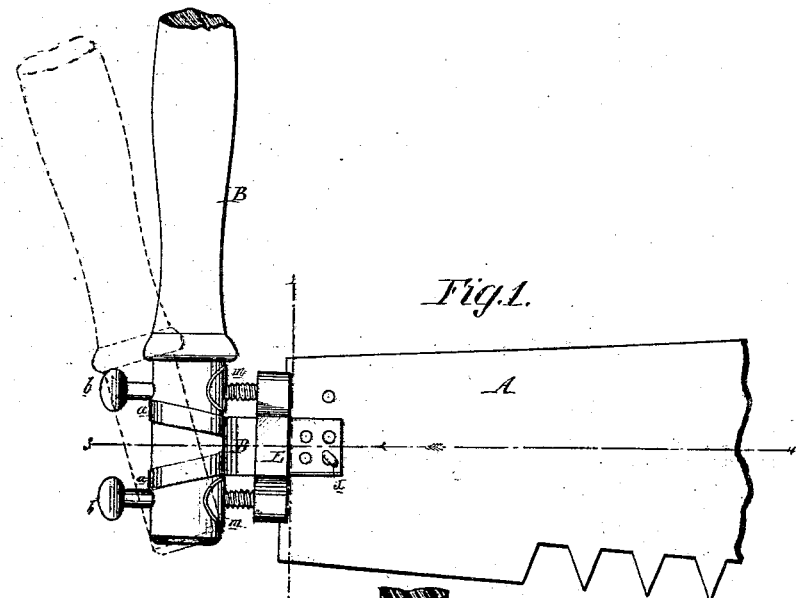
Figure 2:
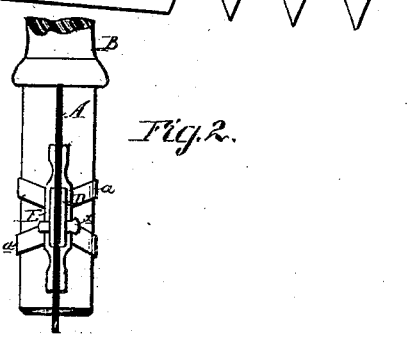
Figure 3:

Figure 1 is a side view of a portion of a cross-cut saw with my improved handle;

Figure 2, a transverse section on the line 1 2, fig. 1, looking in the direction of the arrow;

Figure 3, a sectional plan on the line 3 4, fig. 1; and

Figure 4:
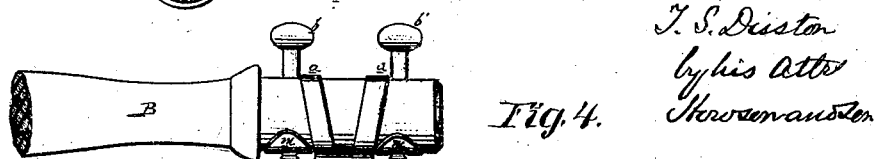

Figure 4, a side view, showing the handle adjusted to a different position on the blade.

General Description.

A represents a portion of a cross-cut saw-blade, and B one of the handles, which is made of wood, as usual.

This handle is embraced near its lower end by the hoops $a$ $a$ at one end of the plate D, the opposite end of which is forked or slotted, for receiving the saw-blade, the end of the latter fitting in a groove in a bar, E, through which the said plate D passes freely.

Against this bar E bear the points of two thumb-screws, $b$ $b'$, arranged one above and one below the plate D, and passing through the handle B, into which may be let metal nuts, $m$ $m$, adapted to the screws.

The slotted end of the plate D has a number of holes, (four in the present instance,) through any one of which and through a hole in the blade is passed a pin, $x$.

The tendency of tightening the screws $b$ $b'$ will be to force the handle B and bar E from each other, and, consequently, to firmly secure the blade to the handle.

One advantage of my invention is that the handle may be adjusted to any inclination desired by the operator by tightening the upper screw $b$ more than the lower screw $b'$; for instance, the handle can be made to assume the inclined position shown by dotted lines.

Another advantage of my invention is that the handle can be readily detached from the ends of the saw and secured to the back of the same, as shown in fig. 4, a position desirable when the saw has to be used for cutting down trees.

Claim.

The plate D, adapted to the handle and to the saw-blade, substantially as described, in combination with the set-screws $b$ $b'$ and grooved bar E.

In testimony whereof I have signed my name to this specification in the presence of two subscribing witnesses.

THOMAS S. DISSTON.

Witnesses:
A. H. SHOEMAKER,
ARTHUR HOOKE.